United States Patent
Ellison et al.

(10) Patent No.: US 9,037,620 B2
(45) Date of Patent: May 19, 2015

(54) FILE SYSTEM ACTIVE SYMBOLIC LINK

(75) Inventors: Carl Melvin Ellison, New York, NY (US); Charles G. Jeffries, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 156 days.

(21) Appl. No.: 12/639,950

(22) Filed: Dec. 16, 2009

(65) Prior Publication Data
US 2011/0145296 A1 Jun. 16, 2011

(51) Int. Cl.
*G06F 17/30* (2006.01)

(52) U.S. Cl.
CPC .... *G06F 17/30126* (2013.01); *G06F 17/30091* (2013.01)

(58) Field of Classification Search
USPC ................................. 707/800, 828
See application file for complete search history.

(56) References Cited

U.S. PATENT DOCUMENTS

| | | | |
|---|---|---|---|
| 5,991,753 A | | 11/1999 | Wilde |
| 6,327,703 B1 * | | 12/2001 | O'Donnell et al. ........... 717/162 |
| 6,405,315 B1 | | 6/2002 | Burns et al. |
| 7,672,981 B1 * | | 3/2010 | Faibish et al. .......... 707/999.204 |
| 8,041,735 B1 * | | 10/2011 | Lacapra et al. ............... 707/783 |
| 2003/0037248 A1 * | | 2/2003 | Launchbury et al. ......... 713/193 |
| 2004/0088152 A1 * | | 5/2004 | Perrin et al. ..................... 703/24 |
| 2006/0136735 A1 | | 6/2006 | Plotkin et al. |
| 2007/0038857 A1 | | 2/2007 | Gosnell |
| 2007/0136607 A1 * | | 6/2007 | Launchbury et al. ......... 713/190 |
| 2007/0174334 A1 | | 7/2007 | Inoue et al. |
| 2008/0256242 A1 * | | 10/2008 | Liebman ....................... 709/226 |
| 2008/0288714 A1 * | | 11/2008 | Salomon et al. .............. 711/103 |
| 2009/0024674 A1 * | | 1/2009 | Gallagher ...................... 707/203 |
| 2009/0183002 A1 * | | 7/2009 | Rohrer et al. ................. 713/168 |
| 2009/0235248 A1 * | | 9/2009 | Conrad .............................. 718/1 |
| 2009/0271412 A1 * | | 10/2009 | Lacapra et al. .................. 707/10 |
| 2010/0036840 A1 * | | 2/2010 | Pitts .................................. 707/5 |

OTHER PUBLICATIONS

"NTFS", retrieved at <<http://en.wikipedia.org/wiki/Master_File_Table>>, Aug. 11, 2009, pp. 13.
Goh, et al., "SiRiUS: Securing Remote Untrusted Storage", retrieved at <<https://cseweb.ucsd.edu/~hovav/dist/xxfs.pdf>>, pp. 1-25.

* cited by examiner

*Primary Examiner* — Joshua Bullock
(74) *Attorney, Agent, or Firm* — Timothy Churna; Kate Drakos; Micky Minhas

(57) ABSTRACT

Data stored on a storage medium can be referenced by multiple independently addressable active symbolic links, with each active symbolic link representing the data through a different transformation. The active symbolic links can be in the form of file system objects, such as files or directories. A single active symbolic link can reference the data stored in multiple collections, or, conversely, a subset of data from a single collection. Active symbolic links can be automatically created for common data transformations. Searching across active symbolic links referencing encrypted data can be performed by multiple protection-specific search engines, or a single search engine that can generate a protection-level aware search index.

20 Claims, 6 Drawing Sheets

FILE SYSTEM ACTIVE SYMBOLIC LINK

BACKGROUND

A file system of a computing device typically includes computer-executable instructions that store and retrieve data in accordance with a predefined organizational format. While early file systems were merely sufficient to delineate one grouping of stored data from another, modern file systems provide additional functionality, including, for example, the generation and utilization of file metadata, the automatic compression and decompression of data, and the utilization of "aliases" or "links" that can enable a single collection of data to be represented as two or more individually addressable files, often located in different folders or directories. As computing devices are increasingly utilized to process and store confidential, or otherwise sensitive, information, encryption technologies and methodologies are also being integrated into file systems such that file data can be stored on a storage medium in an encrypted form, but can be automatically decrypted when accessed by an appropriate user or application.

As file systems become increasingly capable, and complex, there arise potential incompatibilities when data is copied from a computing device utilizing a newer file system to a computing device utilizing an older file system. Additionally, as file systems become more capable and complex, there can exist a greater range of interfaces and functionality that can be exposed, or otherwise made available, by the file system. Application programs that utilize such file systems may not be updated, or otherwise enabled, to utilize the new interfaces and functionality. As a result, application programs may cause errors to be generated that could have been avoided, or may otherwise operate in a suboptimal manner.

Certain aspects of modern file systems can particularly contribute to the suboptimal performance of applications, and even user confusion. More specifically, when modern file systems seek to abstract the performance of certain functions away from applications and users, there arises the potential of user confusion and suboptimal performance of applications. For example, if a file system implements an automatic encryption and decryption functionality, such that data is presented to applications, and users, in a decrypted form, but is actually stored on a storage medium in an encrypted form, applications that may seek to access the encrypted data directly can end up operating in a suboptimal manner unless they conform to the specific interfaces provided by such a file system for accessing such "raw" data.

SUMMARY

In one embodiment, a file system can provide for, and can utilize, active symbolic links that can identify a single set of data through multiple independently addressable file system objects. Each such file system object can specify a transformation that can automatically be applied to the single set of data when the single set of data is accessed through such a file system object. As a simple, illustrative, example, a single set of encrypted data can be referenced by two links: one link that can be an active symbolic link and can reference the set of encrypted data through a decryption transformation and, thus, would cause that single set of encrypted data to appear to application programs, and the user, as a normal, not encrypted, file, and another link, in this case a hard link, that can reference the set of encrypted data directly and without transformation, thereby presenting it as an encrypted file. Applications that, for example, seek to edit the data can access it through the active symbolic link that presents the data through the decryption transformation, while applications that, for example, seek to copy the data and maintain it in an encrypted form can access it through the hard link that references the encrypted data directly. Active symbolic links can be independently addressable and, as such, can be presented in different directories, access paths, and the like. Additionally, active symbolic links can have their own paths and can have separate access control lists (ACLs) so that permission to access a set of data through one link can be separately controlled from the permission to access the same set of data through another link.

In another embodiment, active symbolic links can be utilized with many-to-one or one-to-many linking arrangements. A single active symbolic link can reference multiple sets of data through a transformation that amalgamates such multiple sets of data into a single usable set of data represented by this single active symbolic link. Similarly, multiple active symbolic links can reference a single set of data through a transformation that retrieves, from such a single set of data, multiple usable sets of data represented by the multiple active symbolic links.

In a further embodiment, active symbolic links can be automatically generated for specific types of data. More specifically, active symbolic links can be automatically generated for stored data sets that are often accessed through a transformation, such that the automatically generated active symbolic links provide both access to the stored data sets without transformation, and access to the stored data sets through common transformations.

In a still further embodiment, active symbolic links associated with protection mechanisms, such as data encryption, can be searched by either a search engine that is provided universal access, but which generates a search index that identifies the level of protection associated with each entry in the index, or they can be searched by multiple search engines, each generating its own index, where each of the multiple search engines is provided only limited access commensurate with a specific level of protection.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
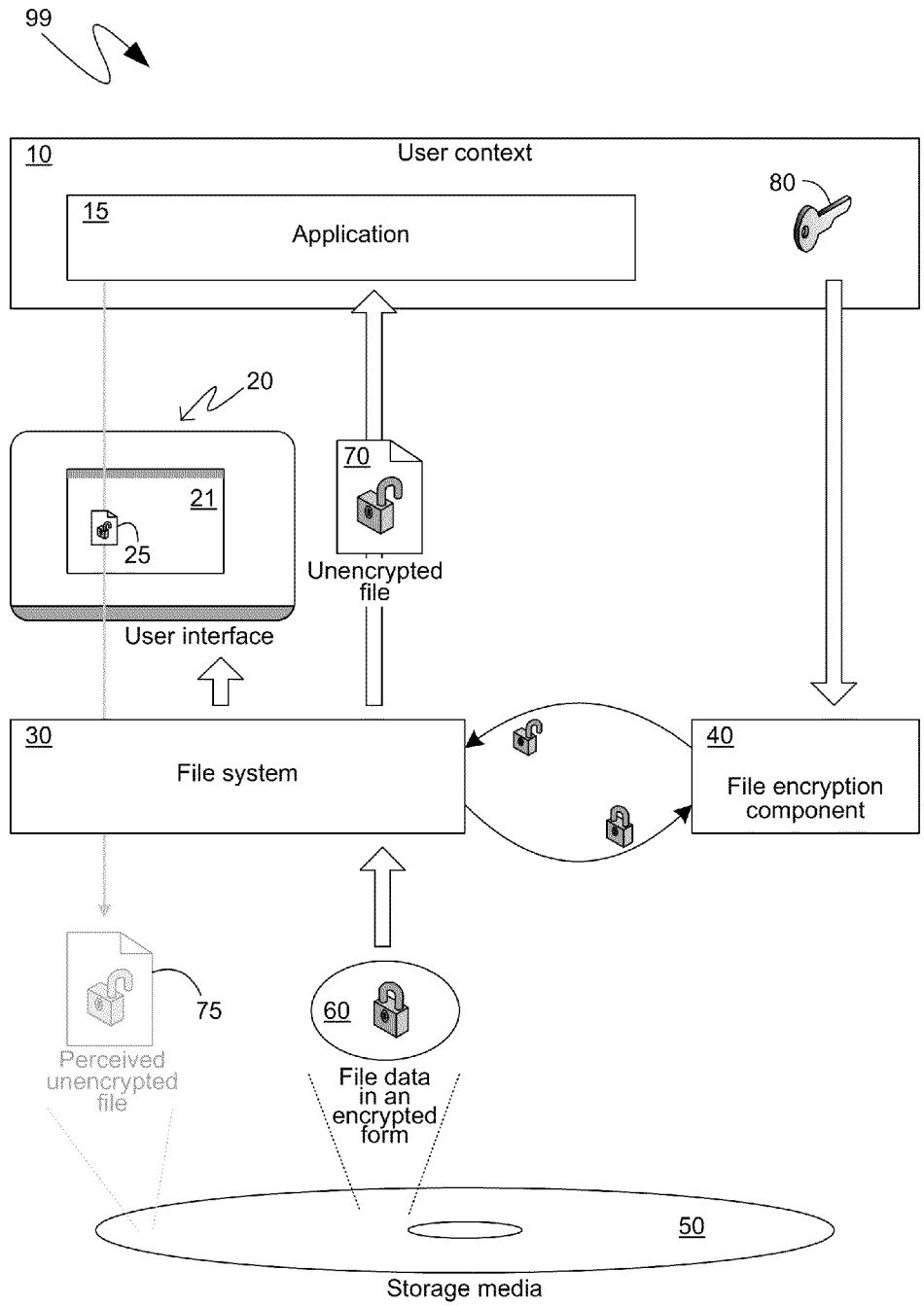
FIG. 1 is a block diagram of an exemplary file system automatically applying a transformation.

The following description relates to file system implemented active symbolic links that provide two or more independently addressable mechanisms by which a single set of data can be accessed, including access for which the file system provides an automatic transformation of the data specified by the selected active symbolic link. Each active symbolic link can identify one or more sets of data stored on a storage medium and, optionally, computer executable instructions that can transform the data prior to presentation to application programs or the user. A single active symbolic link can represent transformed data sourced from multiple sets of data that are stored on a storage medium, or, alternatively, multiple active symbolic links can represent independent transformed data segments sourced from a single set of data stored on a storage medium. Active symbolic links can be automatically generated for appropriate stored sets of data, such as data that is often accessed in a transformed manner. Additionally, to implement searching functionality across protected data, a single search engine can be granted universal access but can generate a search index that identifies the level of protection associated with each entry in the index, or, alternatively, multiple search engines can each generate a search index, where each of the multiple engines is granted access to only a specific level of protection.

The techniques described herein focus on, but are not limited to, a single computing device having a single storage medium. To the contrary, the techniques described below are equally applicable, with only minimal changes that would be obvious to those skilled in the art, to multiple computing devices, multiple storage medium, networked or even virtual computing environments. Consequently, while the descriptions below make reference to a single storage medium within the context of a single computing device, the scope of the descriptions themselves is not intended to be so limited.

Additionally, although not required, the descriptions below will be in the general context of computer-executable instructions, such as program modules, being executed by one or more processing units. More specifically, the descriptions will reference acts and symbolic representations of operations that are performed by one or more processing units, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the processing units or peripherals connected thereto in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the processing units referenced need not be limited to conventional personal computing processing units, and include other processor configurations, including dedicated processors, specific-use processors, communications processors, bus processors and the like often found in hand-held devices, multi-processor systems, microprocessor based or programmable consumer electronics. Similarly, the computing devices referenced in the below descriptions need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

Turning to FIG. 1, an exemplary system 99 is shown, illustrating a common mechanism by which a file system automatically implements a transformation. As shown in the system 99 of FIG. 1, a storage media 50 can have stored upon it file data in an encrypted form 60 such that, if the storage media 50 were to be examined, the file data in encrypted form 60 would not be meaningful without access to the key 80 that could decrypt such data. When the file system 30 accesses the file data in encrypted form 60, such as to provide access to an application 15, the file system can invoke a file encryption component 40 which can access the key 80 from the user context 10 in which the application 15 is executing, and with the key can decrypt the file data in encrypted form 60 into an unencrypted file 70 such as conforms with the file formatting structure known to, and utilized by, the application 15.

Should the application 15 edit the unencrypted file 70, the subsequent saving of such a file back to the storage media 50 could comprise a similar, but reverse, set of steps. More specifically, when the application 15 requests that the file system 30 save the edits made to the unencrypted file 70, the file system can provide the unencrypted file to the file encryption component 40 which can utilize the key 80 to create the file data in encrypted form 60 which can subsequently be stored back onto the storage media 50.

Typically, however, the automatic decryption, and subsequent re-encryption, performed by the file system 30, in conjunction with the file encryption component 40, is abstracted away from the application 15, and users of such an application. Thus, for example, a user interface 20 can comprise a window 21 in which a file 25 can be shown in an unencrypted form, representing the unencrypted file 70. While the user interface 20 is shown as a graphical user interface, comprising a window 21 and an icon of a file 25, such is only for purposes of illustration, and is meant to signify any listing of files, graphical or otherwise, provided by, or otherwise generated with the aid of, the file system 30.

The application 15, and any user of such an application, would perceive, based on the user interface 20, and, more specifically, the listing of the file 25 within such a user interface, as listed by the file system 30, that the file 25 is stored on the storage media 50 in the unencrypted manner shown. Such a perception is illustrated in the system 99 of FIG. 1 as the perceived unencrypted file 75 which is not, in fact, what is stored on the storage media 50.

As will be known by those skilled in the art, such a perception can lead to suboptimal situations. For example, if the application 15 were a backup application program that sought to copy data from the storage media 50 to another, backup, storage medium, then the access, by the application, of the unencrypted file 70 would result in the storage, on the backup storage medium, of the data of the unencrypted file 70 in unprotected form. A more preferred result would have been for the backup application 15 to directly copy the file data in encrypted form 60, thereby storing the file on the backup storage medium in a protected state. As another example, if the application 15 were a backup application program that was not executed in the user context 10, but was executed in another user context, the inability of the file encryption component 40 to access the key 80 would result in an access error being presented by the file system 30 to the backup application 15 even though the backup application did not need to access to the unencrypted file 70 and, in fact, would have preferentially accessed only the file data in encrypted form 60 for purposes of copying such data to backup storage medium.

Figure 2:
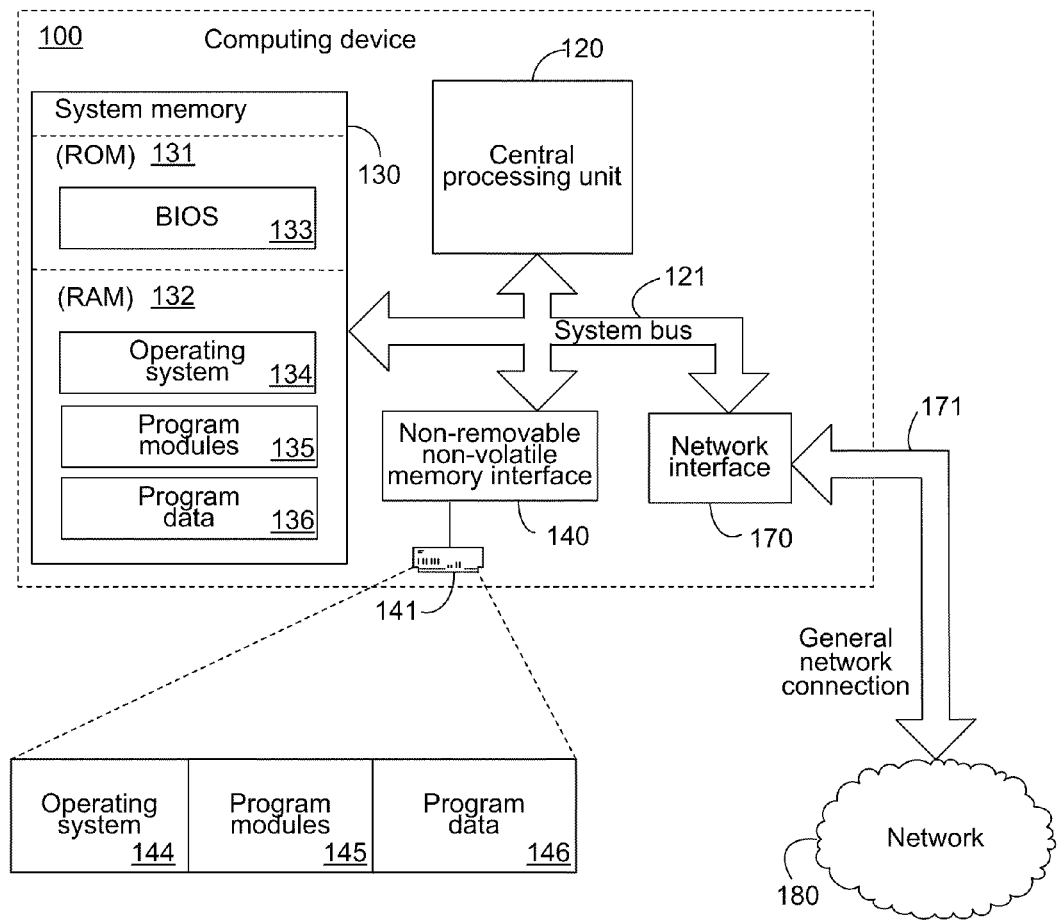
FIG. 2 is a block diagram of an exemplary computing device.

Before proceeding with further detailed descriptions regarding the active symbolic links that can alleviate the suboptimal processing illustrated above, the framework for the below descriptions is provided with reference to FIG. 2, wherein an exemplary computing device 100, such as a computing device upon which a file system supporting active symbolic links can be executed. The exemplary computing device 100 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, which can comprise an active symbolic link capable file system 230 (not shown), other program modules 135, and program data 136.

The computing device 100 may also include other removable/non-removable, volatile/nonvolatile computer storage media. By way of example only, FIG. 2 illustrates a hard disk drive 141 that reads from or writes to non-removable, non-volatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The storage media 50 (not shown) can be any of such storage media, including the hard disk drive 141, which is shown in a typical configuration where it is connected to the system bus 121 through a non-removable memory interface such as interface 140.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing operating system 144, again comprising the file system 230 (not shown), other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

Additionally, the computing device 100 may operate in a networked environment using logical connections to one or more remote computers. For simplicity of illustration, the computing device 100 is shown in FIG. 2 to be connected to a network 180 that is not limited to any particular network or networking protocols. The logical connection depicted in FIG. 2 is a general network connection 171 that can be a local area network (LAN), a wide area network (WAN) or other network. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Figure 3:
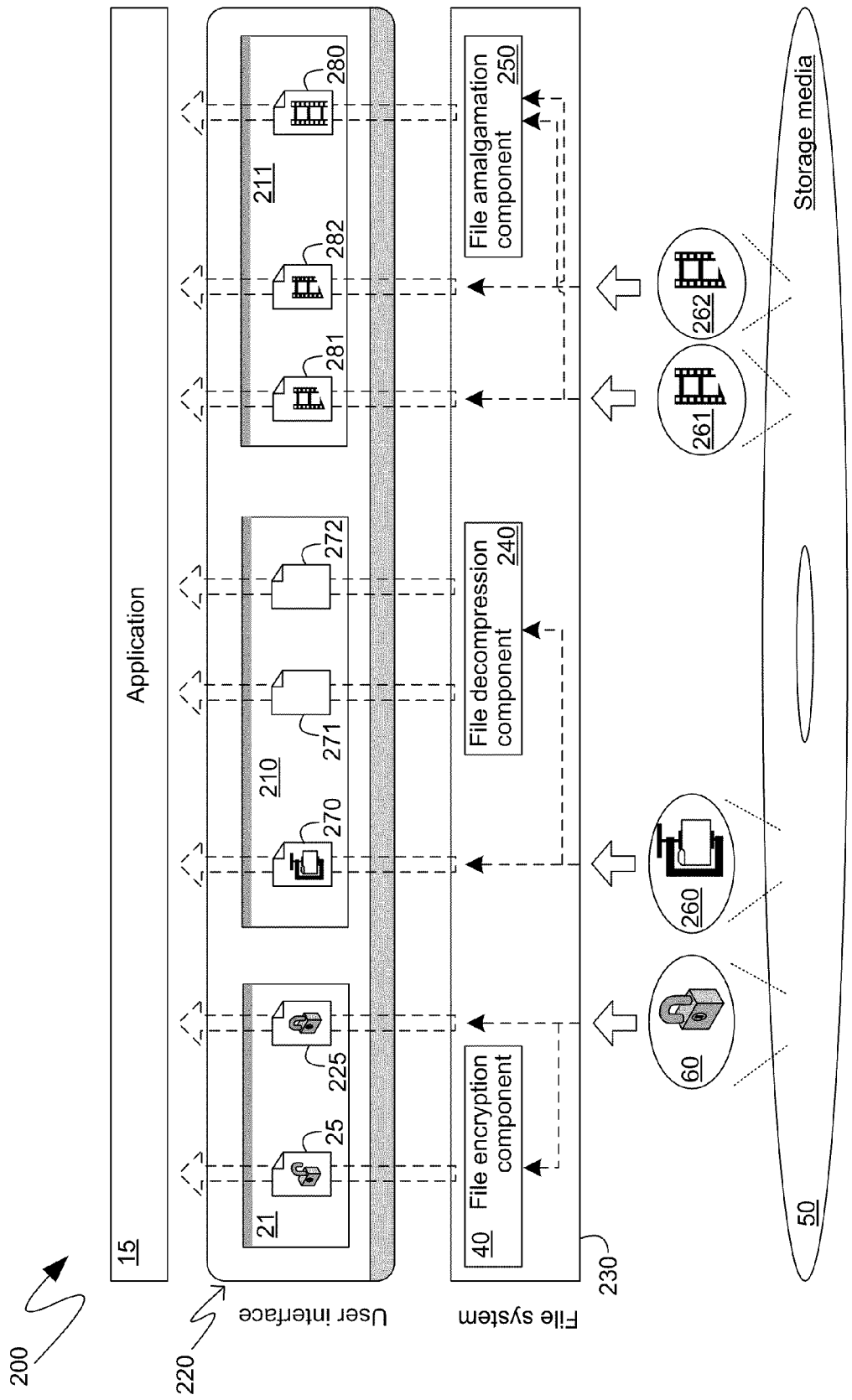
FIG. 3 is a block diagram of an exemplary set of active symbolic links.

Turning to FIG. 3, the system 200 illustrates an active symbolic link capable file system 230, such as can be provided by the operating system 134 described above. The system 200 of FIG. 3 also illustrates a user interface 220 comprising windows 21, 210 and 211, listing files 25, 225, 270, 271, 272, 280, 281 and 282. As before, the user interface 220, while being illustrated as a graphical user interface comprising windows and icons, is not intended to be so limited, and is instead intended to be an illustration of any type of file listing provided by, or generated in association with, the file system 230. In the particular case of the user interface 220, the shown files include active symbolic links as will be described further below.

The storage media 50 of the system 200 of FIG. 3 comprises the file data stored in encrypted form 60, as well as other data collections, such as the compressed archive 260, and the multipart media data collections 261 and 262. Turning first to the previously referenced file data that is stored in an encrypted form 60, as indicated above, the typical presentation, by the file system 30 (not shown), of such encrypted data is in the form of an unencrypted file 70 (not shown). As also indicated above, such a typical presentation can result in suboptimal processing, such as by the application 15, or even confusion on behalf of the user. An active symbolic link capable file system 230, however, can present, such as in the form of a file listing or other user interface 220, one or more active symbolic links, and the original hard link, that each reference the file data in encrypted form 60.

For example, the file data in an encrypted form 60 can be presented by the file system 230 as both an unencrypted file 25, and an encrypted data collection 225, as shown in window 21 of the user interface 220. The hard link that presents the file data in an encrypted form 60 as an encrypted data collection 225 can reference such data directly, such as in a traditional manner. The active symbolic link, on the other hand, that presents the file data in an encrypted form 60 as an unencrypted file 25, can reference not only the file data in encrypted form 60 that is stored on the storage media 50, but can also reference a file encryption component 40 that can be utilized to transform the file data in an encrypted form 60 that is stored on the storage media 50 into the unencrypted file 25. More specifically, the active symbolic link that presents the file data in an encrypted form 60 as an unencrypted file 25 can comprise information that can be utilized by the file system 230 to both locate and retrieve the file data in an encrypted form 60 as stored on the storage media 50, and to then provide such data to the proper transformation computer-executable instructions, such as the file encryption component 40 in the present example.

By presenting such active symbolic links in its listing of files, the file system 230 enables applications, such as the application 15, and users to select, via standard file selection mechanisms, and without requiring the utilization of new interfaces, the specific type, and format, of file that is desired. For example, returning to the above example where the application 15 is a backup application program, such a backup application program could select the hard link that would provide the file data in an encrypted form 60 to the backup application as the encrypted data collection 225. More specifically, when the application 15 selects the hard link associated with the file 225, the file system 230 can provide it with the file data in an encrypted form 60 as stored on the storage media 50 without invoking the file encryption component 40. As such, the application 15 could receive all the data it needs for backup purposes without necessarily having access to the key 80 (not shown). Thus, an application 15, such as a backup application, that does not have access to the key 80 (not shown) would, if it selected the correct link, such as the hard link in the present example, not receive an access error, such as in the manner indicated above, but would instead receive data useful for its purposes.

Conversely, if the application 15 were an editing application, it could select the active symbolic link associated with the file 25 which could provide access, as an unencrypted file 25, to the file data that is stored in an encrypted form 60. More specifically, the active symbolic link 25 could specify both the file data stored in an encrypted form 60 and the file encryption component 40 that can perform the desired transformation. Thus, upon receiving an access request directed to the active symbolic link 25, the file system 230 could obtain the file data stored in an encrypted form 60 from the storage media 50 and provide it to the file encryption component 40 for decryption, or other relevant transformation. Once the transformation has completed, the file system 230 can provide the file 25 to the application 15 in an editable, and not encrypted, form. Subsequent editing of such a file by the application 15 can result in the file encryption component 40 being invoked by the file system 230 to re-encrypt the data prior to its storage on the storage medium 50.

From the perspective of an application, such as the application 15, or from the user's perspective, the active symbolic and hard links associated with the files 25 and 225, respectively, indicate the presence of two different files. The active symbolic link capable file system 230, however, comprises sufficient intelligence, and associated mechanisms, that recognize that the active symbolic and hard links associated with the files 25 and 225 reference the same data, namely the file data stored in an encrypted form 60, except through different, or no, transformations.

While, in one embodiment, the active symbolic links can be presented through the user interface 220 as file icons, or can otherwise be presented as files stored on the storage media 50, in other embodiments the active symbolic links can be in the form of any type of file system object such as, for example, a folder, a network share, or other like file system object. In addition, the active symbolic links can be independently addressable such that, for example, they can be independently located in different directories or other file system hierarchies. Independently addressable active symbolic links can also enable the active symbolic link capable file system 230 to apply different access criteria, such as individually creating or modifying Access Control Lists (ACLs) for the active symbolic links. Thus, for example, the active symbolic link associated with the unencrypted file 25 could be located in a separate folder, or could be subject to different viewing or access criteria even within the same directory than the hard link associated with the encrypted data collection 225. If the active symbolic link associated with the unencrypted file 25 was placed in a different directory than the hard link associated with the encrypted data collection 225, then a backup application program may be only instructed to backup the directory, or directories, that comprise such hard links, while a content-editing application program may be limited to opening and editing files in the directory, or directories, that comprise such active symbolic links. Alternatively, even if the links were maintained in the same directory, a backup application program may be only provided with access rights to the encrypted data collection 225, accessed via the hard link, while a content-editing application program may be only provided with access rights to the unencrypted file 25 via the active symbolic link associated with such a file. Consequently, neither the backup application program nor the content-editing application program would need to be active symbolic link aware or capable. Instead, each program would, via the independently addressable nature of active symbolic links, only have access rights to, or would only be directed to, and, thus, would only "see" the version of the file data stored in an encrypted form 60 that would be appropriate for such an application. Alternatively, of course, application programs that are active symbolic link aware and capable could be aware of both access paths to the file data stored in an encrypted form 60 and could select an appropriate one based on their needs or the instructions of the user.

While the above descriptions have focused on a one-to-one relationship between an active symbolic link and a collection of data, such as the file data in an encrypted form 60, in other embodiments, active symbolic links are not so limited. Thus, for example, as shown in the system 200 of FIG. 3, a single active symbolic link can reference multiple sets of data as stored on the storage media 50, or, alternatively, multiple active symbolic links can reference portions of a single set of data as stored on the storage media. As an example of the latter, a compressed archive 260, comprising multiple compressed files, can be stored as a single data collection on the storage media 50. A hard link can be associated with a file 270, such as whose icon is shown in the exemplary window 210 in the user interface 220, and can, as a hard link, directly reference the compressed archive 260 itself as stored on the storage media 50. Active symbolic links, however, can be associated with files, such as the files 271 and 272, also shown in the exemplary window 210, that are actually part of the compressed archive 260. Put differently, the files 271 and 272 can be files that were compressed into the archive 260, possibly along with other files.

Thus, in one embodiment, an active symbolic link can reference a portion of the data that would be created after data that is stored on the storage media 50 is transformed in accordance with the transformation computer-executable instructions referenced by the active symbolic link. In the particular example of the system 200 of FIG. 3, the active symbolic links associated with the files 271 and 272 can specify the compressed archive 260, as stored on the storage media 50, the file decompression component 240 that can be utilized to decompress the archive 260, and subsequently recompress it if necessary, and can also specify one or more specific files, or other data segments, that may result from the decompression of the archive 260. Should an application, such as the application 15, attempt to access one of such active symbolic links, the compressed archive 260 can be provided, by the file system 230, to the file decompression component 240, and the file system can then, subsequently, select from among the resulting files the specific one referenced by the active symbolic link that was accessed and then present such a file to the accessing application 15. Should the application 15 edit such a file, the edits can be saved by recompressing the file, along with any other files that were in the compressed archive 260, with the file decompression component 240, and then saving the resulting new compressed archive 260 to the storage media 50.

As indicated previously, a single active symbolic link can reference multiple different sets of data as stored on the storage media 50. Thus, turning again to the exemplary system 200 of FIG. 3, the storage media 50 can have stored thereon multipart media data collections 261 and 262 that can represent, for example, chapter files of an overall movie, or other like subparts of a whole. Hard links can be associated with files 281 and 282, such as those presented through the exemplary window 211, that can, given that they are hard links, directly reference the data collections 261 and 262 as stored on the storage media 50. An active symbolic link, however, can be associated with a file 280 that can represent the complete media entity, such as, for example, a complete movie file. Such an active symbolic link can reference computer-executable instructions that can combine the data collections 261 and 262, such as the file amalgamation component 250, and can further reference the data to be combined, such as the data collections 261 and 262.

If an application, such as the application 15, were to access the file 280, the file system 230 could obtain the data collections 261 and 262 from the storage media 50 and provide them to the identified file amalgamation component 250. Subsequently, the file system 230 could present the resulting amalgamated file 280 to the application 15.

Figure 4:
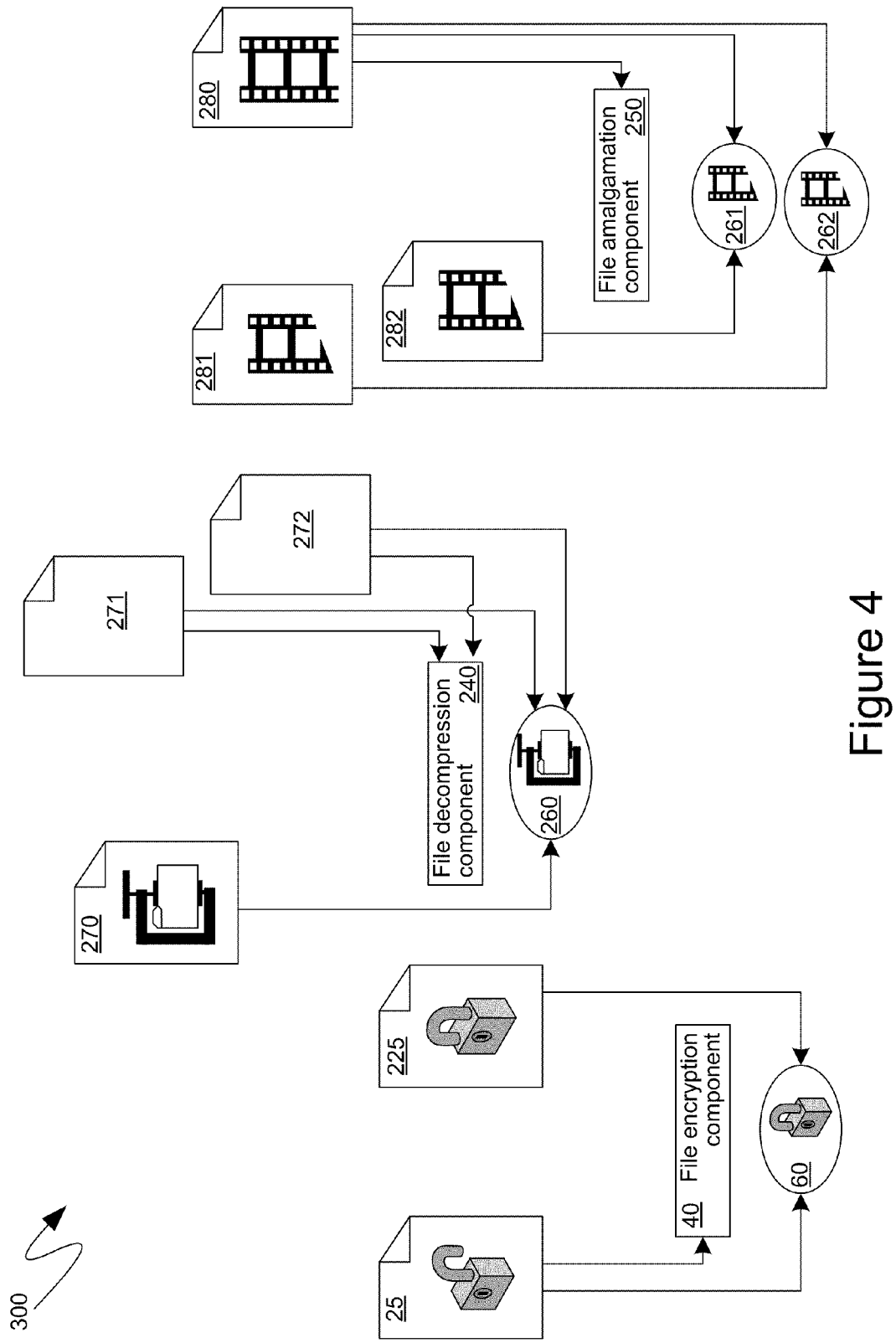
FIG. 4 is a block diagram of another aspect of the exemplary set of active symbolic links.

Turning to FIG. 4, the system 300 illustrates the relevant information which the above described active symbolic links can comprise. Generally, an active symbolic link can comprise at least sufficient information to identify one or more collections of data, or a specific subset of a collection of data, stored by the file system 230 (not shown) on a storage media 50 (not shown), and also at least one set of transformation computer-executable instructions that can perform a transformation on the identified data. In addition, an active symbolic link can comprise sufficient information to enable the file system upon which such an active symbolic link is implemented to recognize, and treat, the active symbolic link as an individually addressable file system object. While in the embodiments described, the active symbolic links were recognized and treated by the file system 230 (not shown) as files, they could likewise have been treated as directories, network shares, or other like file-system objects.

For example, as shown in the system 300, the active symbolic link associated with the file 25 can specify, such as via a pointer, the computer executable instructions of the file encryption component 40 and can further specify, again, such as via a pointer, the data of the file data that is stored in an encrypted form 60. In addition, although not specifically illustrated in FIG. 4, the active symbolic link can specify that it is to be treated by the file system 230 (not shown) as a file. The hard link associated with the file 225, by comparison, can merely specify, again, such as via a pointer, the data of the file data that is stored in an encrypted form 60, and can specify that it is to be treated as a file. The hard link associated with the file 225, however, need not specify any transformation computer-executable instructions as it is intended to provide applications and other users of the file system 230 (not shown) with direct access to the file data that is stored in an encrypted form 60.

In a similar manner, the hard link associated with the file 270 can specify that it is to be treated as a file, and can specify the data of the compressed archive 260, but it need not specify any transformation computer-executable instructions as it is intended to provide direct access to the data of the compressed archive 260. On the other hand, the active symbolic links associated with the files 271 and 272 can also specify that they are to be treated as a file, and can specify the data of the compressed archive 260, but they can further specify transformation computer-executable instructions in the form of the file decompression component 240. In one embodiment, rather than specifying the compressed archive 260 as a whole, the active symbolic links associated with the files 271 and 272 can identify the compressed archive 260 and can specify that they particularly represent one or more subsections of such an archive, such as, for example, one or more files or directories that may have been compressed into such an archive.

Analogously, the hard links associated with the files 281 and 282 can specify that they are to be treated as a file, and can specify the data of the multipart media data collections 261 and 262, respectively. As before, the hard links associated with the files 281 and 282 need not specify any transformation computer-executable instructions, as they are hard links and are intended to provide direct access to the data collections 261 and 262, respectively. The active symbolic link, on the other hand, associated with the file 280 can, in addition to specifying that it is to be treated as a file, further identify both of the data collections 261 and 262, and can also identify transformation computer-executable instructions in the form of the file amalgamation component 250 that are to be utilized to combine the data collections 261 and 262 into the single file 280.

In one embodiment, specific types of files, or other data collections, can have active symbolic links associated with them generated in an automated manner. More specifically, specific types of files, or other data collections, can often be accessed in a transformed manner, or may only be meaningful in a transformed manner. For such files and data collections, active symbolic links can be automatically generated that enable the access of such files and data collections in both the transformed manner, and, via hard links, in their original, untransformed, form. As one example, encrypted files are often, and traditionally, accessed in a decrypted state. They are stored in an encrypted form, traditionally, only as a form of protection. Thus, for such encrypted files, active symbolic links could be automatically generated that, for each encrypted file, one active symbolic link was generated that represented the file in a traditional, unencrypted, form, and another link, this time a hard link (or "persistent link"), was generated that represented the file in its stored, encrypted, form.

Figure 5:
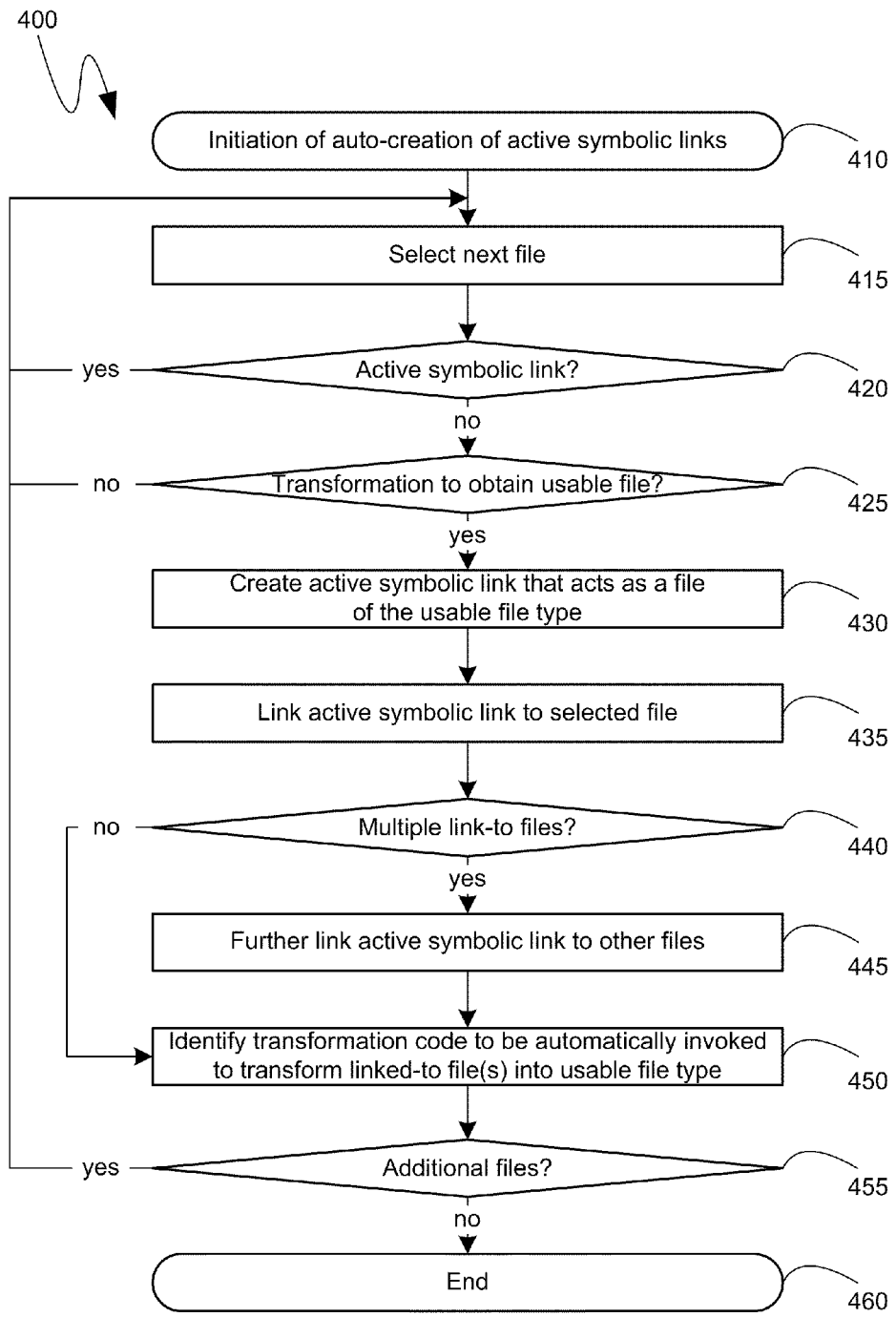
FIG. 5 is a flow diagram of an exemplary automatic creation of active symbolic links.

Turning to FIG. 5, the flow diagram 400 shown therein illustrates an exemplary series of steps that could be performed to automatically generate such active symbolic links. Initially, as shown, at step 410 such an automatic generation of active symbolic links can be initiated. Subsequently, at step 415, the next file to be processed can be selected. At step 420 a determination can be made as to whether the selected file is itself an active symbolic link, or has otherwise already been processed to automatically generate active symbolic links. If the file is itself an active symbolic link, or has otherwise already been processed, processing can return to step 415 and another file can be selected. If, however, the selected file is not itself an active symbolic link, and has not otherwise already been processed, processing can proceed to step 425 at which point a determination can be made as to whether the selected file is traditionally utilized in a transformed state. If the selected file is not traditionally utilized in a transformed state, processing can again return to step 415 and another file can be selected. However, if the selected file is traditionally utilized in a transformed state, such as, for example, compressed files, encrypted files, or other like files, processing can proceed with step 430.

At step 430, active symbolic links can be created in accordance with the transformation traditionally applied to the selected file. Thus, for example, for an encrypted file, an active symbolic link could be created that referenced an unencrypted version of the file, such as via transformation computer-executable instructions that perform encryption and decryption. At step 435, the created active symbolic links can be linked to the selected file, or, more specifically, to the data, as stored on the storage medium, of the selected file.

At step 440, a determination can be made as to whether there are multiple collections of data, as stored on the storage medium, that are to be referenced by one of the created active symbolic links, or, alternatively, whether the data of the selected file, as it is stored on the storage medium, comprises one or more subparts that are each to be individually referenced by yet further active symbolic links to be created. If the determination at step 440 is positive, then additional active symbolic links can be created at step 445, or, alternatively, additional links to active symbolic links already created at step 430 can be made. If, however, the determination at step 440 was negative, processing can skip over step 445 and proceed with step 450 at which point one or more of the created active symbolic links can identify transformation computer-executable instructions that are to be invoked to automatically transform the data of the selected file into a file or format with which that created active symbolic link is associated.

Subsequently, at step 455, a determination can be made as to whether there are other files to be automatically processed in a like manner. If, at step 455, such other files are found to exist, then processing can return to step 415, and another, subsequent, file can be selected. If, however, at step 455, no such other files are found to exist, then the relevant processing can end at step 460.

As will be known by those skilled in the art, modern operating systems, such as those that would incorporate the active symbolic link capable file system 230 (not shown), often provide searching capability that can enable a user to find files based on the content of those files. Such operating systems traditionally employ a search engine that parses through the information stored within files accessible to such a search engine and generates therefrom a search index. When a user searches for a particular term, the search index is referenced to identify those files associated with such a term, and return search results to the user as quickly as possible. If active symbolic links, representing unencrypted versions of otherwise encrypted data, are utilized by the file system, the search engine may generate a search index whose content may include content that was intended to be protected.

Figure 6:
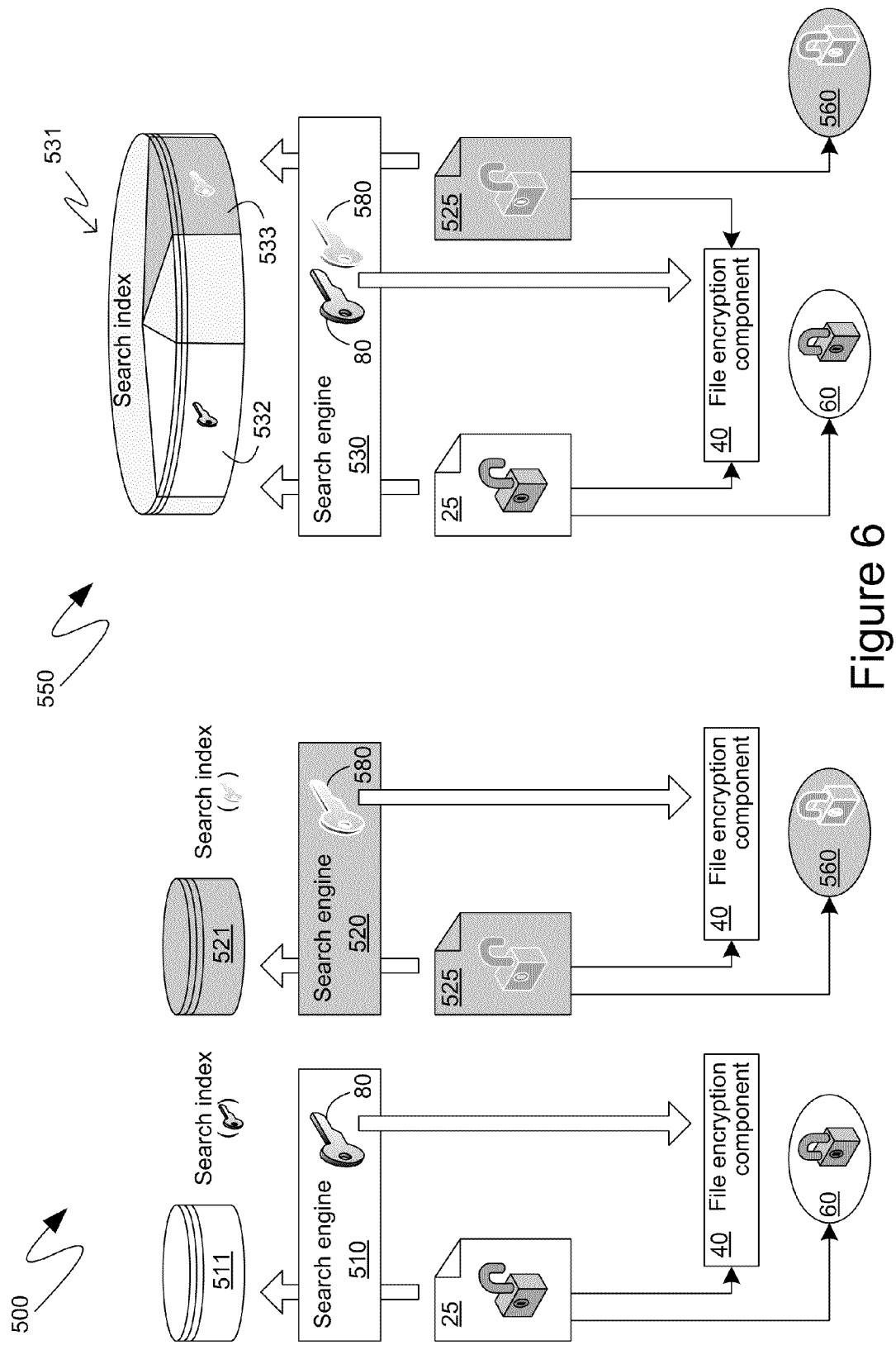
FIG. 6 is a block diagram of an exemplary search strategy as applied to protected active symbolic links.

In one embodiment, to accommodate protected content, such as can be accessed through an active symbolic link, multiple search engines can be utilized, with each search engine being associated with a particular level of protection. Turning to FIG. 6, the exemplary system 500 shown therein illustrates such an embodiment. In particular, an active symbolic link can be associated with an unencrypted file 25 whose content can be the file data stored in an encrypted form 60. A search engine 510, having access to a key 80, can utilize the active symbolic link associated with the unencrypted file 25 to access such data for purposes of generating a search index 511. More specifically, accessing the active symbolic link associated with the unencrypted file 25 can, as indicated above, cause the file system 230 (not shown) to automatically invoke the file encryption component 40 specified by such an active symbolic link to decrypt the file data stored in an encrypted form 60. Because the search engine 510 accessing such an active symbolic link can have access to the key 80 the final encryption component 40 can present the final data stored in encrypted form 60 in a decrypted manner as the decrypted file 25. Consequently, the content of such a decrypted file 25 can be present in the search index 511 generated by the search engine 510.

Another decrypted file 525, however, can be associated with file data stored in an encrypted form 560, and can require a key 580 to decrypt such data. The search engine 510 may not be able to access such decrypted file 525 because the search engine 510 does not have access to the key 580. More specifically, when the search engine 510 attempts to access the active symbolic link associated with the decrypted file 525, the file system 230 (not shown) can invoke the file encryption component 40 and can attempt to decrypt the file data stored in encrypted form 560. Because the search engine 510 does not have access to the key 580, the attempt to decrypt the file data stored in an encrypted form 560 can fail, and the file system 230 (not shown) can indicate, to the search engine 510, that its attempt to access the active symbolic link associated with the decrypted file 525 has failed.

Instead, another search engine 520, which can merely be an independent instance of the search engine 510, can have access to the key 580, but not, for example, the key 80. Such a search engine 520 could then access, through the active symbolic link associated with the decrypted file 525, the decrypted data of such a file and could include such data in the search index 521. In such a manner, data protected by the key 80 can be kept separate from data protected by the key 580, since the search index 511 can comprise data protected by the key 80 but not data protected by the key 580, and, conversely, the search index 521 can comprise data protected by the key 580 but not data protected by the key 80.

When a user attempts to search for a particular term, the search index referenced can be selected based on a key, if any, that can be present in such a user's process space. Thus, for example, if a user were to be able to present the key 80, the user's search results could include results obtained from the search index 511, but not the search index 521. Similarly, if the user were able to present the key 580, the user search results can include results obtained from the search index 521, but not the search index 511. If, on the other hand, the user presented no key, the user's search results could not include information found in either of the search indices 511 and 521, while if the user presented both the key 80 and the key 580, the user's search results could include information found in either of the search indices 511 and 521.

In an alternative embodiment, a single search engine can be granted universal access, and can generate a single search index whose contents can be flagged in an appropriate manner based upon its protection. Turning to FIG. 6, the exemplary system 550 shown therein illustrates such an alternative embodiment. In the illustrated example, a single search engine 530 can be granted universal access by, for example, having access to both the key 80 and the key 580. Such a search engine 530 can, thereby, access both the unencrypted file 25 and the unencrypted file 525 and the content of both unencrypted files can be incorporated into the search index 531 generated by the search engine 530. However, unlike the search indices 511 and 521, the search index 531 can have content that is marked with, or otherwise delineated by, the mechanism by which it was protected. Thus, in the exemplary illustration of the system 550, the search index 531 can comprise data indicated to have been encrypted by the key 80 and data indicated to have been encrypted by the key 580, which are graphically indicated by subsections 532 and 533, respectively.

When a user attempts to search for a particular term, the portions of the search index 531 that can be referenced can be in accordance with such a user's access rights. Thus, for example, if the user performing the search has access to both the key 80 and the key 580, the entire search index 531 can be utilized. Alternatively, if the user only had access to the key 80, then the search index 531, with the exception of that information contained within the subsection 533, could be utilized, and similarly if the user only had access to the key 580, then the search index 531, with the exception of the subsection 532, could be utilized. Likewise, if the user did not have access to either the key 80 or the key 580, then the search index 531 with the exception of both of the subsections 532 and 533, could be utilized.

As can be seen from the above descriptions, mechanisms for generating and utilizing active symbolic links by a file system have been provided. In view of the many possible variations of the subject matter described herein, we claim as our invention all such embodiments as may come within the scope of the following claims and equivalents thereto.

We claim:

1. One or more computer-readable memory comprising computer-executable instructions for implementing active symbolic links, the computer-executable instructions directed to steps comprising:
   presenting a first file system object that represents a first set of data stored on a storage medium, the first file system object comprising a hard link to the first set of data;
   presenting a second file system object that represents a second set of data, the second file system object comprising an active symbolic link to the first set of data, the active symbolic link identifying transformation computer-executable instructions;
   receiving a selection of the presented second file system object;
   obtaining at least a portion of the first set of data from the storage medium;
   providing the obtained at least a portion of the first set of data to the transformation computer-executable instructions; and
   providing the second set of data in response to the selection of the presented second file system object;
   wherein the second set of data is an unencrypted file and the first set of data that is stored on the storage medium is an encrypted version of the unencrypted file.

2. The computer-readable storage media of claim 1, wherein the first file system object and the second file system object are each files.

3. The computer-readable memory of claim 1, wherein the second set of data represents a larger set of data, that is usable as a whole, of which the first set of data is one of a multiple subparts, and wherein further the second file system object comprises active symbolic links to all of the multiple subparts.

4. The computer-readable memory of claim 1, wherein the second set of data represents a smaller set of data, that is individually usable, and which is a subpart of the first set of data; the computer-executable instructions performing further steps comprising presenting a third file system object that represents a third set of data that is different from the second set of data and that is also an individually usable subpart of the first set of data, the third file system object comprising the active symbolic link to the first set of data.

5. The computer-readable memory of claim 1, comprising further computer-executable instructions for generating a first search index from the first set of data and generating a second search index, independent from the first search index, from the second set of data; wherein the transformation computer-executable instructions comprise decryption instructions for decrypting the first set of data into the second set of data using a key.

6. The computer-readable memory of claim 5, comprising further computer-executable instructions for: receiving a search request comprising at least one search term; referencing the first search index for the at least one search term if the search request was received from an entity that does not have access to the key; and referencing the second search index for the at least one search term if the search request was received from an entity that does have access to the key.

7. The computer-readable memory of claim 1, comprising further computer-executable instructions for generating a single search index from both the first set of data and the second set of data; and associating a key with each entry in the search index that is based on the second set of data; wherein the transformation computer-executable instructions comprise decryption instructions for decrypting the first set of data into the second set of data using the key.

8. The computer-readable memory of claim 7, comprising further computer-executable instructions for receiving a search request comprising at least one search term and referencing, for the at least one search term, those entries in the single search index that are associated with keys that are accessible to an entity submitting the search request.

9. The computer-readable memory of claim 1, comprising further computer-executable instructions for:
   determining if the first set of data is traditionally utilized in a transformed state; and
   automatically generating the second file system object comprising the active symbolic link if the determining determines that the first set of data is traditionally utilized in the transformed state;
   wherein the transformed state in which the first set of data is traditionally utilized is the second set of data.

10. A method of implementing active symbolic links comprising the steps of:
    generating a file listing comprising a first file that represents a first set of data stored on a storage medium and that comprises a hard link to the first set of data and a second file that that represents a second set of data, the second file comprising an active symbolic link to the first set of data, the active symbolic link identifying transformation computer-executable instructions;

receiving a selection of one of the files;

obtaining at least a portion of the first set of data from the storage medium;

providing the obtained at least a portion of the first set of data to the transformation computer-executable instructions; and providing the second set of data in response to the selection;

wherein the second set of data is an unencrypted file and the first set of data that is stored on the storage medium is an encrypted version of the unencrypted file.

11. The method of claim 10, wherein the second set of data represents a larger set of data, that is usable as a whole, of which the first set of data is one of a multiple subparts, and wherein further the second file comprises active symbolic links to all of the multiple subparts.

12. The method of claim 10, wherein the second set of data represents a smaller set of data, that is individually usable, and which is a subpart of the first set of data; and wherein the file listing further comprises a third file that represents a third set of data that is different from the second set of data and that is also an individually usable subpart of the first set of data, the third file comprising the active symbolic link to the first set of data.

13. The method of claim 10, further comprising the steps of: generating a first search index from the first set of data and generating a second search index, independent from the first search index, from the second set of data; wherein the transformation computer-executable instructions comprise decryption instructions for decrypting the first set of data into the second set of data using a key.

14. The method of claim 13, further comprising the steps of: receiving a search request comprising at least one search term; referencing the first search index for the at least one search term if the search request was received from an entity that does not have access to the key; and referencing the second search index for the at least one search term if the search request was received from an entity that does have access to the key.

15. The method of claim 10, further comprising the steps of: generating a single search index from both the first set of data and the second set of data; and associating a key with each entry in the search index that is based on the second set of data; wherein the transformation computer-executable instructions comprise decryption instructions for decrypting the first set of data into the second set of data using the key.

16. The method of claim 15, further comprising the steps of: receiving a search request comprising at least one search term; and referencing, for the at least one search term, those entries in the single search index that are associated with keys that are accessible to an entity submitting the search request.

17. The method of claim 10, further comprising the steps of:

determining if the first set of data is traditionally utilized in a transformed state; and automatically generating the second file system object comprising the active symbolic link if the determining determines that the first set of data is traditionally utilized in the transformed state;

wherein the transformed state in which the first set of data is traditionally utilized is the second set of data.

18. A computing device comprising:

a storage device comprising a first set of data; and a central processing unit configured to perform acts comprising:

presenting a first file system object that represents the first set of data, the first file system object comprising a hard link to the first set of data;

presenting a second file system object that represents a second set of data, the second file system object comprising an active symbolic link to the first set of data, the active symbolic link identifying transformation computer-executable instructions;

receiving a selection of the presented second file system object;

obtaining at least a portion of the first set of data from the storage medium;

providing the obtained at least a portion of the first set of data to the transformation computer-executable instructions; and providing the second set of data in response to the selection of the presented second file system object;

wherein the second set of data is an unencrypted file and the first set of data that is stored on the storage medium is an encrypted version of the unencrypted file.

19. The computing device of claim 18, wherein the storage device further comprises a search index generated from both the first set of data and the second set of data, the search index comprising associations with a key for each that is based on the second set of data; wherein the transformation computer-executable instructions comprise decryption instructions for decrypting the first set of data into the second set of data using the key.

20. The computing device of claim 18, wherein the central processing unit is configured to perform further acts comprising:

determining if the first set of data is traditionally utilized in a transformed state; and automatically generating the second file system object comprising the active symbolic link if the determining determines that the first set of data is traditionally utilized in the transformed state;

wherein the transformed state in which the first set of data is traditionally utilized is the second set of data.

* * * * *